(No Model.) 6 Sheets—Sheet 1.

E. B. BEECHER & J. P. WRIGHT.
METHOD OF AND MECHANISM FOR FILLING MATCH BOXES.

No. 543,717. Patented July 30, 1895.

Witnesses:
Jas. E. Hutchinson
Henry C. Hazard

Inventors
Ebenezer B. Beecher and Jacob P. Wright
by Trindle & Russell, their Attys (No Model.) 6 Sheets—Sheet 6.

E. B. BEECHER & J. P. WRIGHT.
METHOD OF AND MECHANISM FOR FILLING MATCH BOXES.

No. 543,717. Patented July 30, 1895.

Witnesses:
Jas. E. Hutchinson.
Henry C. Hazard.

Inventors
Ebenezer B. Beecher & Jacob P. Wright
by Prindle & Russell, their attys

UNITED STATES PATENT OFFICE.

EBENEZER B. BEECHER AND JACOB P. WRIGHT, OF NEW HAVEN, CONNECTICUT, ASSIGNORS TO THE DIAMOND MATCH COMPANY, OF CHICAGO, ILLINOIS.

METHOD OF AND MECHANISM FOR FILLING MATCH-BOXES.

SPECIFICATION forming part of Letters Patent No. 543,717, dated July 30, 1895.

Application filed June 2, 1894. Serial No. 513,301. (No model.)

*To all whom it may concern:*

Be it known that we, EBENEZER B. BEECHER and JACOB P. WRIGHT, of New Haven, in the county of New Haven, and in the State of Connecticut, have invented certain new and useful Improvements in Methods of and Mechanism for Filling Match-Boxes; and we do hereby declare that the following is a full, clear, and exact description thereof, reference being had to the accompanying drawings, in which—

Figure 1:
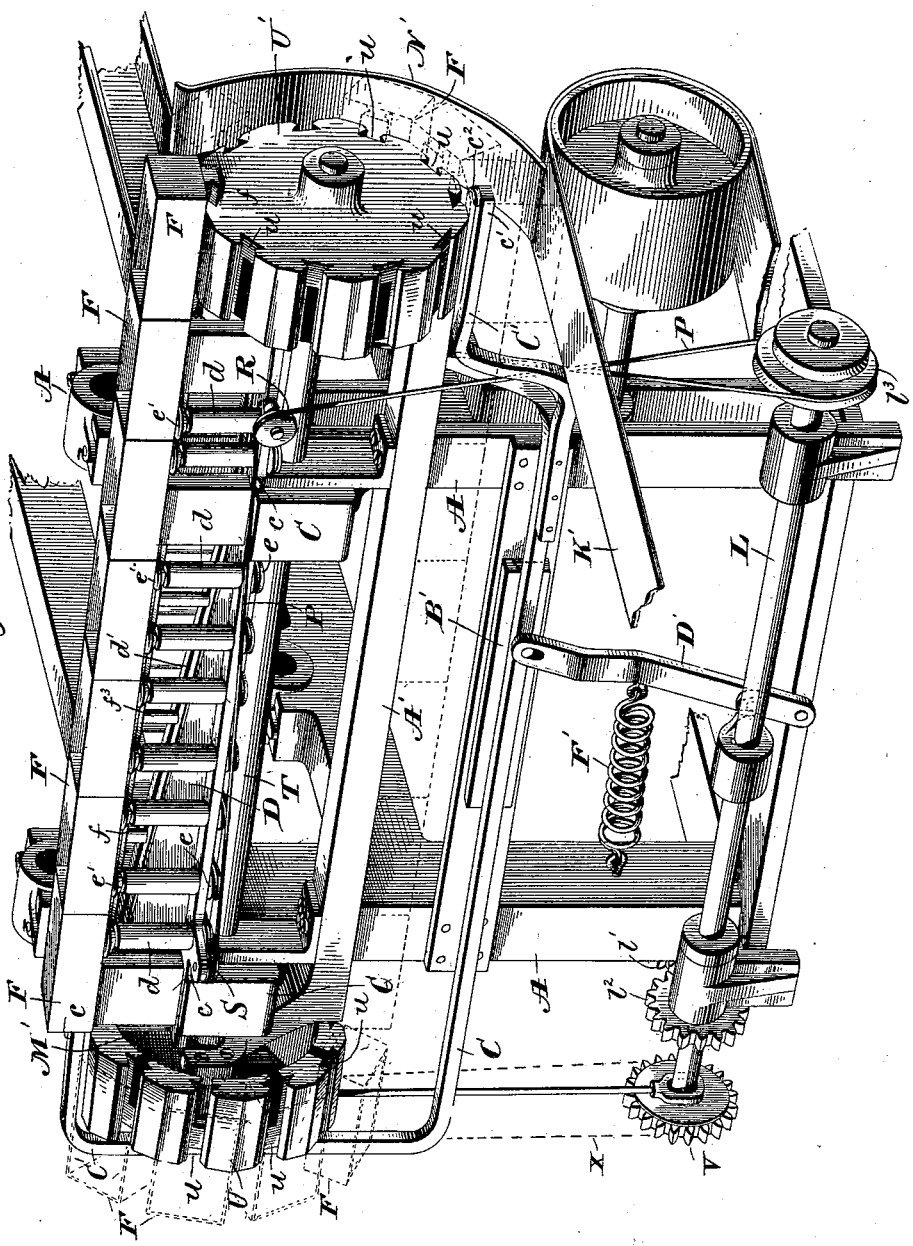
Figure 2:
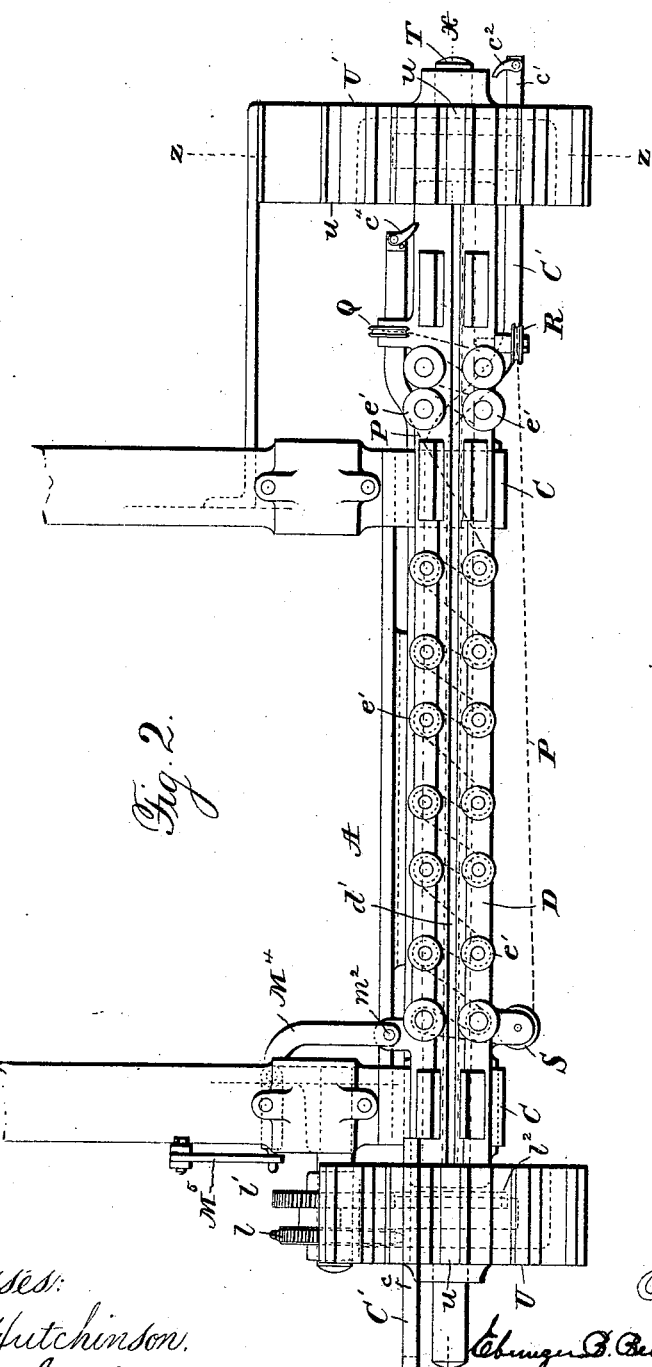
Figure 3:
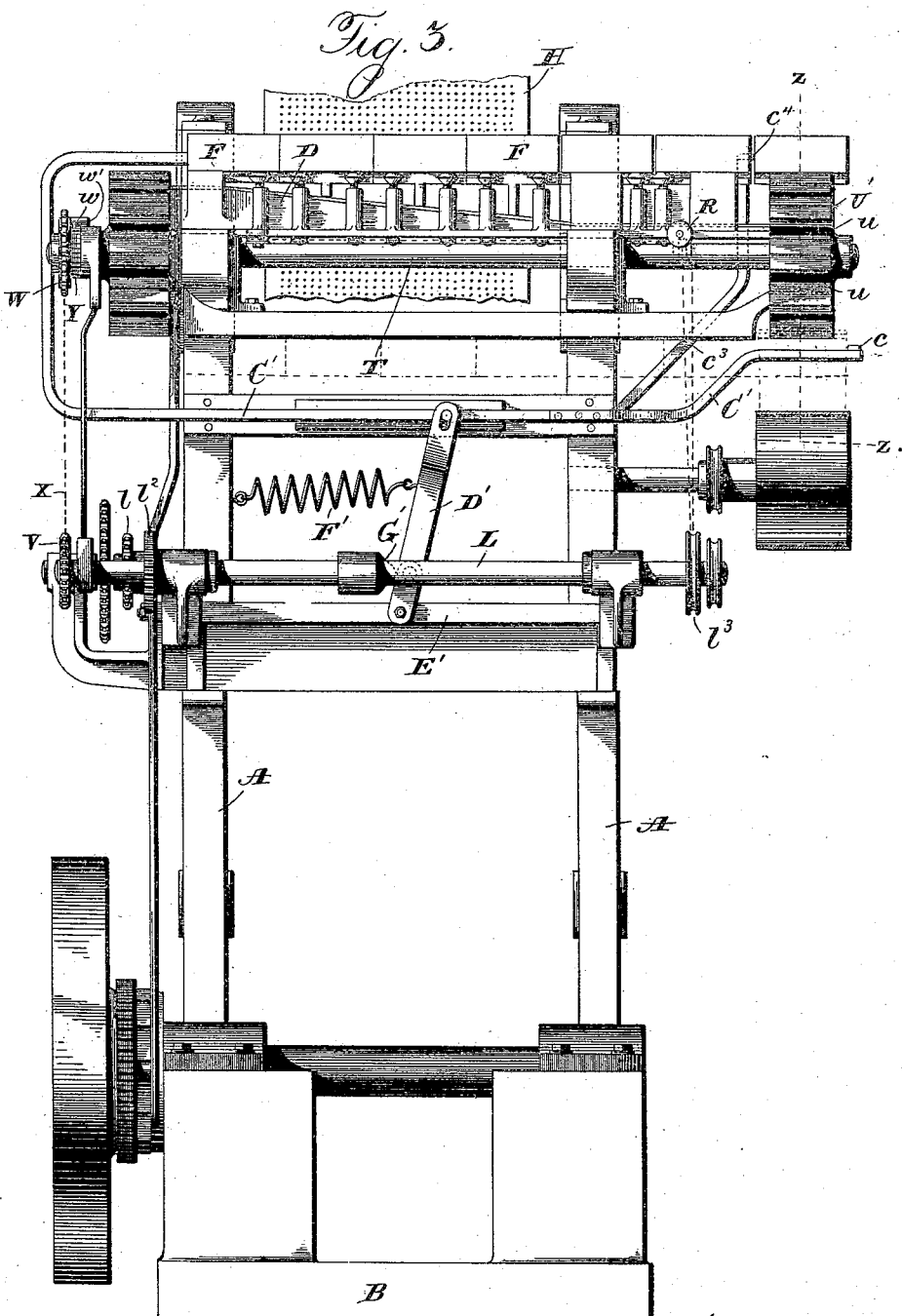
Figure 4:
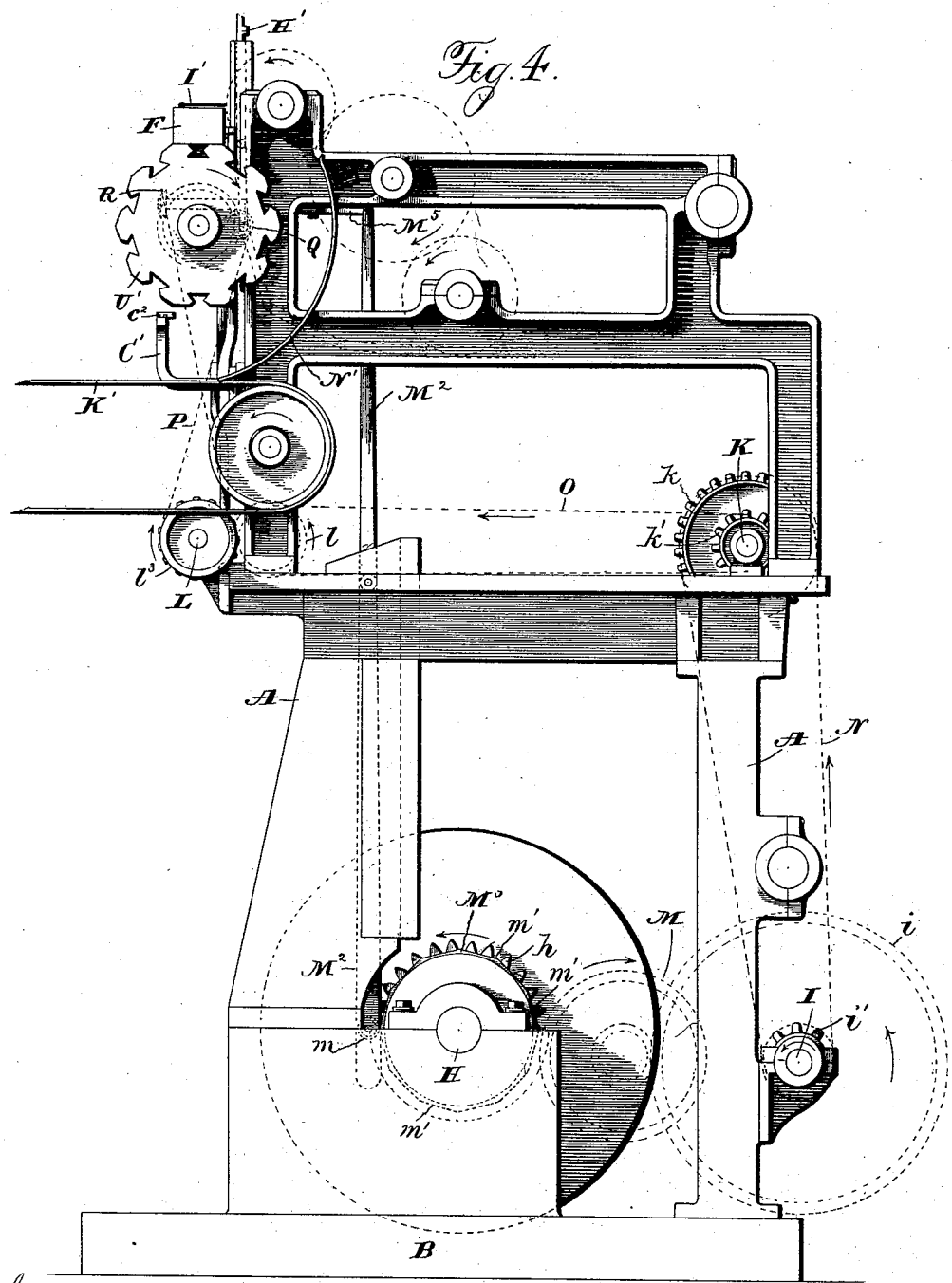
Figure 5:
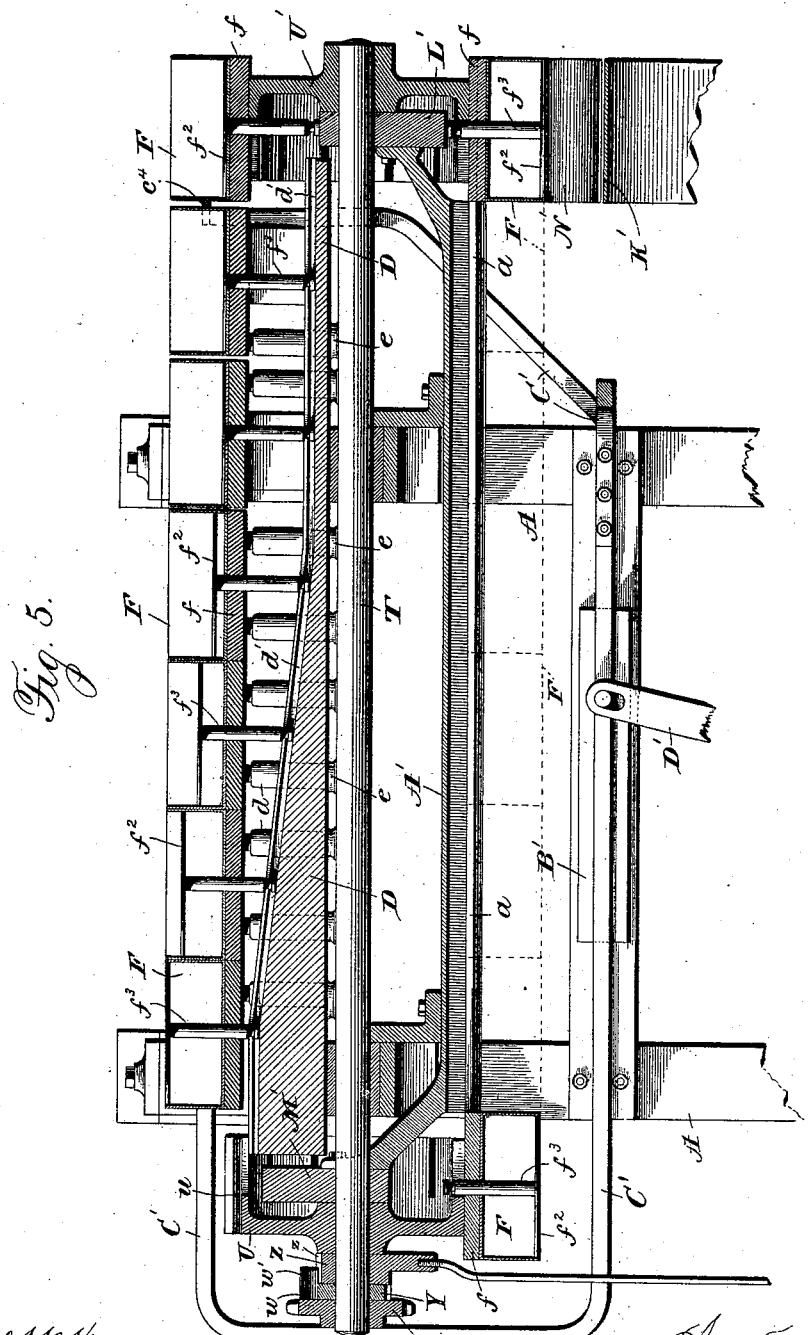
Figure 6:
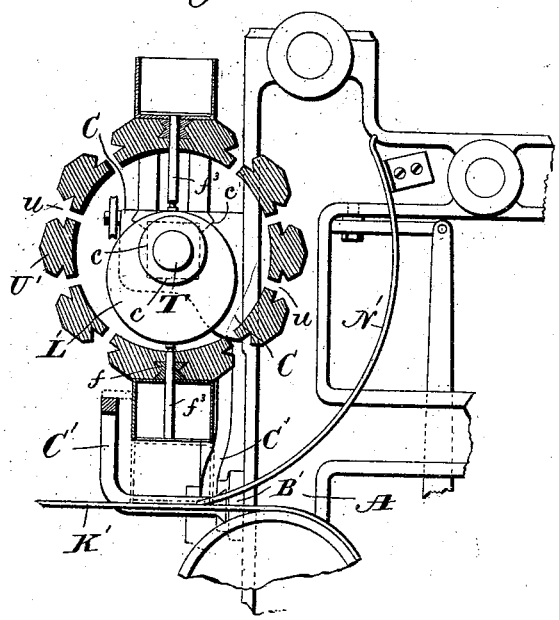
Figure 7:
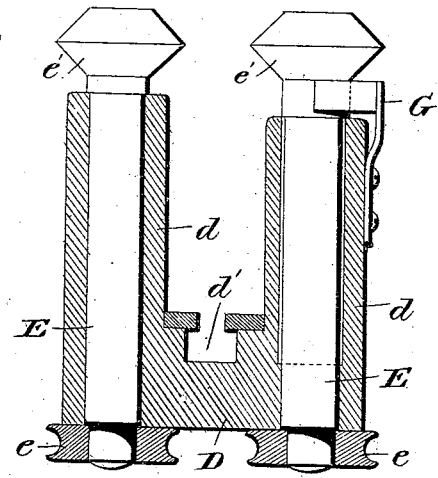
Figure 8:
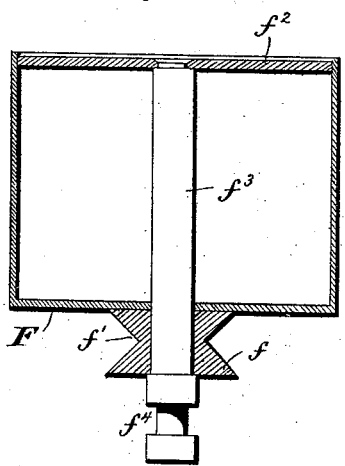
Figure 9:
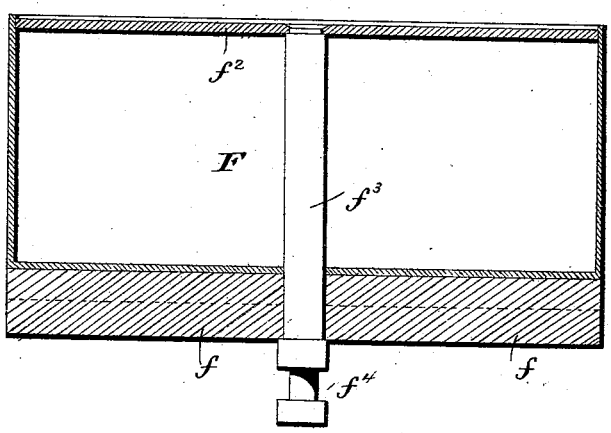

Figure 1 is a perspective view of our machine arranged for use. Fig. 2 is a plan view of the same from the upper side, the dummy match-boxes being removed to show the mechanism beneath. Fig. 3 is a front elevation of said machine. Fig. 4 is a side elevation of the same. Fig. 5 is a vertical section upon line $x\,x$ of Fig 2. Fig. 6 is an enlarged section upon line $z\,z$ of Figs. 2 and 3. Fig. 7 is an enlarged side elevation, partly in section, of a pair of feed-rollers; and Figs. 8 and 9 are respectively enlarged transverse and longitudinal sections of one of the dummy boxes.

Letters of like name and kind refer to like parts in the several figures.

The object of our invention is to enable matches to be boxed as they pass in completed form from the machine; and to such end our said invention consists in the method and means employed, substantially as and for the purpose hereinafter specified.

In the application of our invention to practice, any desired general construction of frame may be employed, but for convenience it will be illustrated in connection with one of the forms of match-machines in which two side frames A and A, having the shape shown in Figs. 2 and 3, are secured upon and extend in parallel lines upward from a suitable base B, and are connected together at several points by means of cross-bars.

Secured at a point near the upper front portion of each of the frame sides A is a bracket C, which extends horizontally forward, and within its upper side is provided with a T-shaped groove $c$, that longitudinally is in a line with the corresponding groove $c$ of the opposite arm, and within such grooves is fitted a frame D, which has the general shape shown in Figs. 1, 3, and 5, and is adapted to slide longitudinally within certain limits.

The frame D, as seen, consists of a base which at each end is adapted to enter into and move longitudinally within the bracket-grooves $c$ and $c$, and between such ends is provided with two rows of cylindrical bosses $d$ and $d$, that extend vertically upward and are arranged in parallel lines, with one boss of each row transversely opposite to a boss of the other row. Between said rows of bosses the upper face of said frame has an inclination from near one end to the opposite end of the same, and within such inclined surface is formed a T-shaped groove $d'$, the object of which will be hereinafter explained.

Within each boss $d$ is journaled longitudinally a spindle E, which extends entirely through the same and the base of the frame D, and upon its lower end has secured a grooved pulley $e$, and upon its upper end is provided with a conical head $e'$. Said frame thus constructed is adapted to receive and contain a series of dummy match-boxes F, each of which, in general form and shape, corresponds to the like features of the match-box to be filled, but is slightly smaller horizontally, so as to enable one of the latter to be placed over the former.

Each dummy box F has secured longitudinally upon its lower side a strip $f$, that has within each side a V-shaped groove $f'$, which corresponds to and is adapted to pass over the conical heads $e'$ and $e'$ of the spindles E and E, the construction being such as to enable said grooved strip to be contained within the space formed by the rows of spindles and by the simultaneous rotation of the latter to be caused to pass between the same from one end of the frame D to the opposite end of the same. In order that said spindle-heads may be caused to grasp said grooved strip with sufficient force to insure the movement desired, the upper portions of one row of spindles loosely fill their bearings, and by means of a spring G, which is secured at one end upon each boss $d$, and its opposite free end bears upon the spindle E journaled therein, operates to hold said end with a yielding pressure at the limit of its motion toward the corresponding spindle E of the opposite row.

Each dummy box F is provided with a loosely-fitted false bottom $f^2$, which has secured to its center a rod $f^3$, that from thence extends downward through the real bottom of such dummy and through the grooved strip $f'$, and at its lower end is provided with a T-shaped head $f^4$, that is adapted to fit into and slide loosely within the frame-groove $d$. The length of each rod $f^3$ is such that when its dummy is over the highest portion of the inclined groove $d'$ the false bottom $f^2$ will be at or slightly below the upper edge of such dummy, and when the latter is at or over the the lower end of such inclined groove said false bottom will be at its lowest point, the downward movement being regular between such points.

For the driving of the spindles E and E and of other connected or co-operating mechanisms, a shaft H is journaled horizontally within the lower front portions of the frame A and A; a second shaft I is journaled at the rear side of the same, a third shaft K is journaled at the rear side near the central portion of said frame, and a fourth shaft L is journaled in about the same vertical position at the front of the frame. The motion of the driving-shaft H is communicated to the shaft I by means of two gear-wheels $h$ and $i$, that are respectively secured upon said shafts, and an intermediate gear-wheel M, meshing with gear-wheel $h$, and has turning with it a pinion $h'$, which meshes with gear-wheel $i$, while the motion of said shaft I is communicated to said shaft K by sprocket-chain N engaging sprocket-wheels $i'$ and $k$ on the respective shafts. Shaft L is driven from shaft K by means of sprocket-chain O engaging sprocket-wheel $k'$ on shaft K, and sprocket-wheel $l$ carrying a gear $l'$, which meshes with and drives the pinion $l^2$ on shaft L.

Upon the shaft I is a grooved wheel $l^3$, from and around which a belt P passes to two grooved pulleys Q and R, that are journaled upon the frame D, the first of such pulleys being arranged with its axis in a line with the length of said frame and the second pulley with its axis at a right angle thereto. From said pulley Q the belt passes to and around the end pulley $e$ upon the opposite side, from thence to and around the adjacent end pulley $e$, and from the latter around the remaining spindle-pulleys $e$ and $e$ in the manner shown by the dotted lines of Fig. 2, until it reaches the last pulley $e$ upon the same side of frame D as pulley Q, when it passes across and around a pulley S, and from thence to said pulley R, the arrangement being such that the movement of said belt will cause all of the spindles E and E to rotate, those of each row rotating in the same direction and opposite to those of the opposite row, so that if a dummy box is placed between the heads of said spindle at one end of the frame it will be caused to move lengthwise of and to the other end of such frame.

It is intended that each dummy box shall be moved lengthwise of the frame D and simultaneously filled with matches, its contents then discharged, and said box then returned to the starting-point. To effect such object there is journaled immediately below and parallel with said frame a shaft T, which upon each end immediately adjacent to the end of said frame is provided with a disk U or U', that has formed within its periphery a series of grooves $u$ and $u$, which correspond to and are each adapted to receive the dovetail strip $f$ of a dummy box F.

The groove $u$ and $u$ of the disks U and U' are relatively arranged so that when the upper one of such grooves in one disk is caused to come in line with the space between the rows of heads $e$ and $e'$ of the spindles E and E, the corresponding groove of the opposite disk will come in line with said space between the rows of heads at the other end of the frame D, and thereby enable a dummy box to be moved from the lower end of said frame to the adjacent disk, and another dummy box to be simultaneously moved from the other disk into position within such frame.

The disks U and U' are given a step-by-step rotation by means of a sprocket-wheel V, which is secured upon the shaft L, a similar wheel W upon the end of the shaft T, a chain X connecting such wheels, a pawl $w$ pivoted upon the wheel W, and a ratchet-wheel Y, which is secured upon said shaft T and provided with teeth $y$ and $y$, that correspond in number to the grooves $u$ and $u$ of said disks. A disk Z, journaled upon the shaft T adjacent to said ratchet-wheel and held by any suitable means, has the form of a circle except at one point, where is provided a flat place $z$, and is adapted to receive upon its periphery a lug $w'$, which projects laterally from the pawl $w$. If now the sprocket-wheel is caused to revolve, its pawl $w$ will be prevented from engaging with the teeth $y$ and $y$ of the ratchet Y until the lug $w'$ reaches the flattened place $z$, when the pawl will engage with one of said teeth and move said ratchet, the shaft T, and the disks U and U' forward until by the riding of said lug $w'$ upon the circular part of said disk said pawl is thrown out of engagement.

It is intended that the dummy boxes shall pass from the upper side of the disk U into the spindle-frame D, through the latter to the upper side of the disk U', and from the lower side of the latter to a groove in the lower side of said disk U. To enable such to be done there is provided a bar A', which is suitably supported in position and extends between the lower portions of the disks U and U', and within its lower face is provided with a dovetail-groove $a$ that corresponds to and at its ends coincides with the lower grooves $u$ and $u$ of said disks, the arrangement being such as to enable a dummy box F to be moved to carry the dovetailed strip on its bottom from the lower groove $u$ of said disk U' into said groove $a$ and through the latter into the lower groove $u$ of said disk U.

In order that the dummy boxes may be automatically moved to and from the transfer devices U and U', there is secured upon the frame A and A between the groove-bar A' and the shaft L a bar B', that has formed within its face a dovetail-groove $b$, that receives and contains a bar C', which is adapted to be moved longitudinally therein in opposite directions by means of a lever D', which lever has its lower end pivoted upon a fixed support E', its upper end loosely pivoted to said bar C', and between such points is held by a spring F', with a yielding pressure against a cam G' that is secured to and rotates with said shaft L, the arrangement being such as to cause said bar C' to be moved longitudinally to the limit of its motion in each direction at each rotation of said shaft.

One end of the bar C' extends horizontally outward beyond the disk U, thence upward, and then horizontally inward, with its end $c$ in position to impinge against the outer end of the dummy box F contained within the upper groove $u$ of said disk. The opposite end of said bar extends upward and longitudinally forward to a point slightly beyond the outer face of the disk U', and has pivoted upon its end $c'$ a spring-pawl $c^2$, that when said bar $c'$ is moved in one direction will trip over the side of a dummy box held in the lower groove $u$ of said disk, and when said bar is moved in an opposite direction will engage with the outer end of such box and move the latter into the groove $b$ of the bar B'. An arm $c^3$, extending from said bar C' upward and forward terminates slightly above the upper side of said disk U' and is provided with a spring-pressed pawl $c^4$, which when said bar is moved in one direction bears against but trips over the side of a dummy box at the adjacent end of the frame D, and when moved in an opposite direction engages with the end of such dummy and moves the latter into the upper groove $u$ of said disk U'. If now the dummy boxes are placed within the frame D and within the grooves $u$ and $u$ upon the ascending side of the disk U, and the shaft L caused to revolve, the longitudinal movement of the bar C' in a forward direction will cause the dummy box at the top of the disk U to be moved therefrom into the adjacent end of said frame D, the dummy box at the opposite end of said frame to be moved therefrom into the upper groove of the disk U', while upon the return movement of said bar C' the dummy box within the lower groove $u$ of said disk U' will be moved from the same into the grooved bar A', and if the latter is filled with dummy boxes will simultaneously move the entire row in the same direction and cause the outer box of the row to enter into the contiguous groove $u$ in the disk U.

The movements of the dummy boxes within the frame D are not uniform in speed, as from the larger diameters of the heads $e'$ and $e'$ of the first pair of spindles E and E a box passing from the disk U will be moved thereby faster than they would be by the smaller heads $e'$ $e'$ after having passed from between such larger heads, in consequence of which a pressure from the rear is produced, which causes said boxes to be kept closely together until each reaches and is engaged by the heads of the last four spindles, when, as such heads have a larger diameter, said box is suddenly separated from the next box in the row and carried to the adjacent end of the frame D into position for engagement by the pawl $c^4$, which carries it along to insert the dovetailed strip on its bottom into the groove $u$ of the disk U'.

The mechanism thus described is attached to or combined with a match-making machine in which the completed matches are contained within an endless chain of perforated plates H' and H', that pass downward directly in rear of the box-containing frame and from which the matches I' and I' of each row are automatically ejected when they reach a point immediately over the dummies. As each dummy moves into the field of the falling matches the false bottom $f^2$ is at or near the top of the box and receives the falling matches while, as the dummy passes along the front of the match-carrier, said bottom is constantly depressed until, as it reaches the farther edge of such carrier, said false bottom is at the lowest point of its movement, and if the relative vertical movement of the carrier and the lateral movement of the dummy have been properly timed the latter is filled with matches. As each dummy reaches the lower end of the inclined portion of the groove $d'$ and enters upon the horizontal portion of the same, it is moved away from the next succeeding dummy and a paper box or tray is placed over the same, after which said dummy passes on to the disk-carrier U' and by successive step-by-step movements of the latter is carried to the lower side of the same, when by its weight and the weight of the matches such box drops from said dummy upon a horizontally-arranged conveyer K', by which it is carried to a suitable place to receive the outside cases.

To supplement the weight of the box and matches and positively insure the removal thereof from the dummy, a round plate L' is placed eccentrically within the disk-carrier U' and supported fixedly therein, whose periphery is engaged by the ends of the rod $f^3$ and gradually forces the same and the attached false bottom $f^2$ outward as the disk U' makes a half-revolution from the point where it receives the dummy. A similar round plate M' is placed within the other disk U, but with its center diametrically opposite that of the plate L', which operates upon the rod $f^3$ of each dummy to move the false bottom thereof to its upper position in the dummy.

In order that the matches may more readily fill the dummy boxes and lie therein in order, the frame D is given a slight longitudinally-reciprocating movement, while by means of a curved guard N', made of light spring metal, each box is held in position upon the dummy during its passage from the top to the lower side of the disk-carrier U'.

For the purpose of giving the frame D the slight reciprocating movement referred to above to shake the matches down in place within the dummy boxes as they travel along frame D, we provide the lever $M^2$, pivoted in frame A and having its lower end provided with a roller $m$, pressed against the cam-disk $M^3$ on shaft H, which disk has a series of cam-faces $m'$ $m'$, adapted to give the lever end a series of short impulses as shaft H revolves. The upper end of this lever is connected with one end of the elbow-lever $M^4$ by a link $M^5$, the other end of this latter lever being pivotally connected with frame D at $m^2$. With the lower end of lever $M^2$ held normally against the revolving cam-disk $M^5$, as shown in Fig. 4, the frame D, with the dummy boxes carried thereby, will be given a series of shakes or jars while the filling is going on, so that the matches as they fall into the dummy boxes will be well shaken down into place.

Having thus described our invention, what we claim is—

1. In the art of boxing matches, the method which consists in feeding the matches from a source of supply, causing a series of temporary holders placed close together to pass along under the falling matches, so as to be gradually filled thereby, as they pass across the path of the matches, jarring the holders, while they are thus progressing, in a direction out of a vertical line and substantially at right angles to the matches, as they are to lie in the filled holders, separating the holders after they have passed beyond the path of the falling matches, then placing inverted trays or boxes in position, so that their sides and ends extend around the space occupied by the matches in the holders, inverting the holders, and transferring their contents to the trays or boxes placed to receive such contents falling from the holders, substantially as and for the purpose specified.

2. In the art of boxing matches, the method which consists in feeding the matches from a source of supply, passing along under the falling matches a series of temporary holders with movable bottoms, causing such bottoms to be raised before the respective holders begin to cross the path of the matches, and lowering them as the passage of the holders across the path of the matches continues, substantially as and for the purpose shown.

3. In the art of boxing machines, the method which consists in discharging the matches in rows from a match making machine, causing a series of temporary holders with movable bottoms to travel across the path of the rows of matches being discharged, with their bottoms raised, as they begin to pass into the path of the matches, lowering such bottoms, as the holders continue their travel across such path, and transferring the contents of the filled holders to suitable trays or boxes, substantially as and for the purpose set forth.

4. In a match boxing machine, in combination with a source of supply of matches, a series of separate match holders, means for moving them across the path of the matches coming from the source of supply, in combination with means for moving the holders onward at a faster rate after they have passed beyond the path of the matches, so as to separate each holder bodily from the one behind it as it passes beyond such path, whereby room is left between each holder and the adjacent one, to allow a box or tray to be placed down over it, substantially as and for the purpose specified.

5. In a match boxing machine in combination with a source of supply of matches, a series of separate holders, means for moving them across the path of the matches, and means for moving the holders before and after they leave the path of the matches at a speed greater than that at which they are moved across such path, so that each holder is bodily separated from the one succeeding it to leave a space between adjacent holders, substantially as and for the purpose set forth.

6. In a match boxing machine, in combination with a source of supply of matches, a series of separate holders, means for moving them across the path of the matches from the source of supply, and means for moving the holders forward to separate them bodily after they have passed beyond the path of the matches, so that inverted trays can be placed over them, substantially as and for the purpose described.

7. In a match boxing machine, in combination, a source of supply of matches, one or more match securing holders, two parallel series of rotating heads adapted to engage opposite sides of a portion of each holder and move the latter across the path of the matches from the source of supply, substantially as and for the purpose specified.

8. In a match boxing machine, in combination with a source of supply of matches, one or more match receiving holders, rotary heads to engage portions of the holders and move them across the path of the matches from the source of supply, and other rotating heads having greater peripheral speed to move the holders at increased speed, after leaving the path of the matches, to separate the holders, substantially as and for the purpose shown.

9. In a match boxing machine, in combination with a source of supply of matches and one or more match receiving holders, rotary devices engaging portions of the holders to move them across the path of the matches from the source of supply, and other rotating devices having greater peripheral speed, situated so as to engage and move the holders before they have reached, and after they have left the path of the matches, whereby the holders are packed closely together before they reach the path of the matches, and are bodily separated from each other as they reach a point beyond such path, substantially as and for the purpose set forth.

10. In a match boxing machine, in combination with a suitable source of supply of the matches, a series of separate, independently movable match receiving holders, means for moving them continuously across the path of the matches from the source of supply, and means for inverting them after they have passed beyond such path, substantially as and for the purpose described.

11. In a match boxing machine, in combination with a suitable source of supply of matches, one or more match receiving holders, carrying devices to carry the latter across the path of the matches and the inverter, adapted to receive the holders from the carrying devices, and invert them after they have passed beyond the path of the matches, substantially as and for the purpose shown.

12. In a match boxing machine, in combination with a suitable source of supply of matches, one or more match receiving holders, carrying devices to move the latter, and a rotary inverter for inverting the holders to which the latter are passed from the carrying devices, substantially as and for the purpose set forth.

13. In a match boxing machine, in combination with one or more match receiving holders, means for moving the same, and a rotary grooved disk adapted to receive the holders from the moving devices and invert them, substantially as and for the purpose described.

14. In a match boxing machine, the combination of a match holder, means for moving the same in the path of matches coming from a source of supply, a rotary grooved disk which is adapted to receive and sustain the holder, and means for moving such holder into and out of one of the grooves in said disk, substantially as and for the purpose shown.

15. In a match boxing machine, the combination of a match holder, constantly moving means for moving the same in the path of matches coming from a source of supply, and an intermittently movable rotary disk for inverting such holder, substantially as and for the purpose set forth.

16. In a match boxing machine, the combination of a series of independently movable separate match holders, means for moving the same in the path of matches coming from a source of supply, a separate rotary transferring device at each end of such path, and means for moving the holders from the means for moving them in the path of the matches into and out of engagement with the transferring device, substantially as and for the purpose described.

17. In a match boxing machine, the combination of a series of match holders, two ways therefor, a rotary, grooved transfer disk at the corresponding ends of said ways, and means for moving the holders from the ways into the grooves of the disks, and out of the grooves into the ways, substantially as and for the purpose specified.

18. In a match boxing machine, the combination of a series of match holders, a series of rotary devices for engaging with and moving said holders in the path of matches coming from a suitable source of supply, a rotary transfer disk, a sliding bar carrying two pawls, one of which moves the holders into and the other out of engagement with the disk, a grooved way into which said holders are moved from the latter, and a second rotary transfer disk, into and out of engagement with which said holders are moved, substantially as and for the purpose shown.

19. In a match boxing machine, in combination with a suitable source of supply of matches, a match receiving holder with movable bottom, means for moving the holder across the path of the matches from the source of supply, and means for lowering the movable bottom, while the holder is being moved across such path, substantially as and for the purpose shown and described.

20. In a match boxing machine, in combination with a suitable source of supply of matches, one or more match receiving holders having movable bottoms, means for moving the holders across the path of the matches from the source of supply, a cam track, and means on the holder bottom engaging such track, so that the bottoms will be held raised, until the holders reach the path of the matches, and will be lowered gradually, as the holders pass across such path, substantially as and for the purpose specified.

21. In a match boxing machine, in combination with a suitable source of supply of matches, a series of match receiving holders having movable bottoms, means for moving such holders repeatedly across the path of the matches, cam mechanism to raise the bottoms of the holders before the latter reach the path of the matches from the source of supply, and to cause such bottoms to descend lower and lower during the progress of the respective holders across the path of the matches, substantially as and for the purpose shown.

22. In a match boxing machine, the combination of a temporary match holder, a series of rotary devices for engaging with and moving said holder, a frame supporting such devices, and means for imparting a vibratory motion to such frame, substantially as and for the purpose shown.

23. In a match boxing machine, in combination with a match receiving casing and means for moving the same along, a frame supporting these moving devices, and means for jarring this frame in a direction at right angles to the matches as they are to lie in the casing, substantially as and for the purpose specified.

24. In a match boxing machine, the combination of a temporary match holder, having a movable bottom, a rotary disk for inverting said holder, which receives and holds the holders, and an eccentric for moving such bottom outward, having its longest diameter on its under side so as to eject the contents of the holder as the latter is inverted, substantially as and for the purpose set forth.

25. In a match boxing machine, the combination of a temporary match holder having a movable bottom and adapted to receive a permanent box, a rotary disk adapted to receive and hold said holder, an eccentric for moving such bottom outward to expel its contents and remove said box as the holder is brought into inverted position having its longest diameter on its under side, and a guard to engage the box as said disk rotates, substantially as and for the purpose described.

In testimony that we claim the foregoing we have hereunto set our hands this 3d day of May, 1894.

EBENEZER B. BEECHER.
JACOB P. WRIGHT.

Witnesses:
L. W. BEECHER,
H. D. STANNARD.